(12) United States Patent
Ahola et al.

(10) Patent No.: US 11,891,499 B2
(45) Date of Patent: Feb. 6, 2024

(54) GRANULAR CELLULOSE PRODUCT

(71) Applicant: KEMIRA OYJ, Helsinki (FI)

(72) Inventors: Juhana Ahola, Espoo (FI); Kaisa Karisalmi, Espoo (FI); Christos Rampotas, Espoo (FI); Perttu Heiska, Espoo (FI); Mika Suvanto, Espoo (FI)

(73) Assignee: KEMIRA OYJ, Helsinki (FI)

( * ) Notice: Subject to any disclaimer, the term of this patent is extended or adjusted under 35 U.S.C. 154(b) by 101 days.

(21) Appl. No.: 17/261,192

(22) PCT Filed: Jul. 19, 2019

(86) PCT No.: PCT/EP2019/069592
§ 371 (c)(1),
(2) Date: Jan. 19, 2021

(87) PCT Pub. No.: WO2020/038670
PCT Pub. Date: Feb. 27, 2020

(65) Prior Publication Data
US 2021/0269623 A1 Sep. 2, 2021

(30) Foreign Application Priority Data

Jul. 19, 2018 (SE) .................................. 1850925-7
Jul. 19, 2018 (SE) .................................. 1850926-5

(51) Int. Cl.
| | | |
|---|---|---|
| C08L 1/02 | (2006.01) | |
| B29B 9/12 | (2006.01) | |
| C08H 8/00 | (2010.01) | |
| C08L 5/06 | (2006.01) | |
| C08L 5/14 | (2006.01) | |
| C08L 97/00 | (2006.01) | |
| C08L 97/02 | (2006.01) | |
| D21H 11/18 | (2006.01) | |

(52) U.S. Cl.
CPC .................. *C08L 1/02* (2013.01); *B29B 9/12* (2013.01); *C08H 8/00* (2013.01); *C08L 5/06* (2013.01); *C08L 5/14* (2013.01); *C08L 97/005* (2013.01); *C08L 97/02* (2013.01); *D21H 11/18* (2013.01)

(58) Field of Classification Search
CPC .................................. B29B 9/12; C08L 97/02
See application file for complete search history.

(56) References Cited

U.S. PATENT DOCUMENTS

| | | | | |
|---|---|---|---|---|
| 5,227,024 A * | 7/1993 | Gomez | .................. | D21H 17/02 162/149 |
| 5,964,983 A * | 10/1999 | Dinand | .................... | D21C 5/00 426/573 |
| 6,602,994 B1 * | 8/2003 | Cash | ........................ | C08B 15/00 536/84 |
| 2003/0065059 A1 * | 4/2003 | Krishnaswamy | ..... | D06M 10/02 524/1 |
| 2013/0005866 A1 * | 1/2013 | Yano | ........................ | C08J 5/045 524/13 |
| 2013/0197132 A1 * | 8/2013 | Fujikura | .................. | C08K 5/13 524/35 |
| 2016/0145805 A1 | 5/2016 | Kroener et al. | | |
| 2017/0306562 A1 * | 10/2017 | Phipps | .................... | D04H 1/492 |
| 2017/0360063 A1 | 12/2017 | Farr et al. | | |
| 2018/0230242 A1 * | 8/2018 | Staunstrup | .............. | A23L 33/24 |
| 2018/0371211 A1 * | 12/2018 | Laukkanen | ............... | C08L 1/02 |
| 2019/0092909 A1 * | 3/2019 | Yano | ........................ | C08L 67/04 |
| 2019/0169314 A1 * | 6/2019 | Yoshida | ................. | C08B 11/193 |
| 2019/0185585 A1 * | 6/2019 | Laukkanen | ................ | C08J 9/28 |
| 2019/0309476 A1 * | 10/2019 | Karisalmi | .............. | D21H 17/21 |
| 2020/0015504 A1 * | 1/2020 | Suijker | .................... | A23L 23/10 |
| 2020/0263358 A1 * | 8/2020 | Windebank | ............ | D21C 9/007 |
| 2021/0269980 A1 * | 9/2021 | Karisalmi | ................. | C08L 5/14 |
| 2021/0269981 A1 * | 9/2021 | Karisalmi | .............. | D21H 17/54 |

FOREIGN PATENT DOCUMENTS

| | | | | |
|---|---|---|---|---|
| EP | 3351562 | 7/2018 | | |
| RO | 128509 | 6/2013 | | |
| WO | WO-2010149711 A2 * | 12/2010 | ............... | D21B 1/12 |
| WO | 2017009042 | 1/2017 | | |
| WO | 2017067901 | 4/2017 | | |
| WO | 2017103335 | 6/2017 | | |
| WO | WO-2017103335 A1 * | 6/2017 | ............... | D21C 9/00 |

OTHER PUBLICATIONS

Santomaso et al. (Chemical Engineering Science 58 (2003) 2857-2874) (Year: 2003).*
Hiasa et al. (J. Fiber Sci. Technol. 72(1), 17-26, 2016) (Year: 2016).*
Balea et al. "Valorization of corn stalk by the production of cellulose nanofibers to improve recycled paper properties." BioResources. Feb. 22, 2016;11(2):3416-31.
Hiasa et al. "Prevention of Aggregation of Pectin-Containing Cellulose Nanofibers Prepared from Mandarin Peel." Journal of Fiber Science and Technology. Jan. 12, 2016;72(1):17-26.
Jongaroontaprangsee et al. "Production of nanofibrillated cellulose with superior water redispersibility from lime residues via a chemical-free process." Carbohydrate polymers. Aug. 1, 2018;193:249-58.

(Continued)

*Primary Examiner* — Liam J Heincer
(74) *Attorney, Agent, or Firm* — Robin L. Teskin; Baker, Donelson, Bearman, Caldwell & Berkowitz, PC

(57) ABSTRACT

The present invention relates to a granular microfibrillated cellulose product comprising a microfibrillated cellulose originating from agricultural biomass, said microfibrillated cellulose product comprising ≤75 wt % of cellulose, preferably ≤70 wt %, based on dry solids content of said product, wherein said granular microfibrillated cellulose product has a bulk density of 500-1200 kg/m³; a flowability of 5-60 ml/s, measured by a Copley scientific powder flowability tester having a stainless steel cylinder with orifice 16 or funnel with orifice 15; and a water content of at most 60 wt %, based on total microfibrillated cellulose product. The present invention further relates to its manufacture and use in and manufacture of paper and paperboard products.

20 Claims, 1 Drawing Sheet

(56) References Cited

OTHER PUBLICATIONS

Siqueira et al. "Re-dispersible carrot nanofibers with high mechanical properties and reinforcing capacity for use in composite materials." Composites Science and Technology. Feb. 8, 2016;123:49-56.

* cited by examiner

Original product
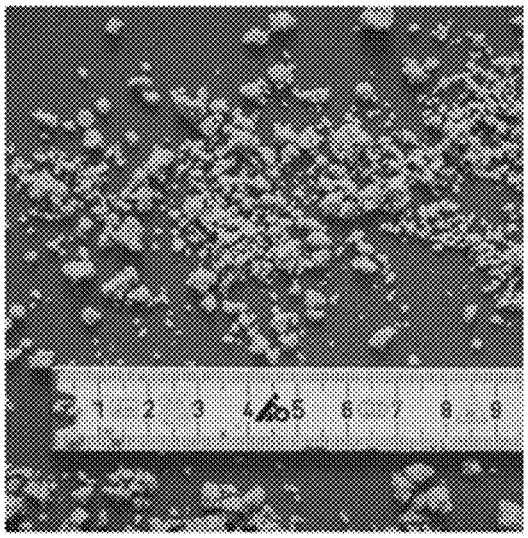
Final product
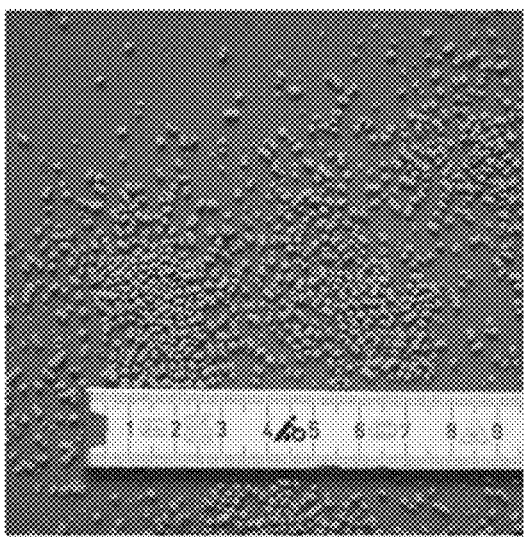

GRANULAR CELLULOSE PRODUCT

RELATED APPLICATIONS

This application is a U.S. National Phase application of Int'l Appl. No. PCT/EP2019/069592, filed Jul. 19, 2019, which claims priority to Swedish Appl. No. SE 1850925-7, filed Jul. 19, 2018, and Swedish Appl. No. SE 1850926-5, filed Jul. 19, 2018, each of which are incorporated herein by reference in their entireties.

FIELD OF THE INVENTION

The present invention relates to a granular microfibrillated cellulose product, manufacture thereof, and its use in paper making.

BACKGROUND

The use of microfibrillated cellulose in paper making has been known for some time. The biggest challenge of using microfibrillated cellulose (MFC) in industrial applications is to obtain a transportable microfibrillated cellulose material for a subsequent process. Commercialization of microfibrillated cellulose has been struggling as dewatering of MFC is time and energy consuming due to gel-like and hydroscopic properties of MFC in or together with water, and hornification is easily initiated at higher solids contents, which damages the cellulose fibrils. This causes significant decrease in performance, e.g. when used as a paper strength additive.

Known techniques to provide microfibrillated cellulose materials involve dewatering, and drying. As water is difficult to remove from the MFC additives may be added to improve the dewatering properties. However, these known processes, i.e. dewatering, drying, and additive addition to achieve high solids contents, may provide deterioration of the MFC and the properties it may bring in a pulp and paper manufacturing process. Such deteriorated MFC, if used as a paper strength agent, would not give strength to the pulp or paper manufactured. Deterioration may provide hornification when the processed MFC is redispersed before or upon addition to a paper making process. Hornification may be seen as a distinct change in the viscosity values, i.e. a drop in viscosity, during processing. Hornification may be seen as a distinct change in the viscosity values, i.e. a drop in viscosity, during processing in paper production. Due to the problems with hornification MFC is normally not dried very much, which causes problems and costs with transporting, and may even result in waste production instead of conversion to value-adding products.

Most of the research and commercialization efforts have been put on wood-based cellulose. However, there is an increasing demand and interest on efficient usage of the world's resources and recently more efforts and research has been put into secondary streams from industry. By finding new ways to provide value-adding products which are easier to handle and transport so that our resources may be used much more efficiently than commonly used.

SUMMARY

The present invention introduces a new granular microfibrillated cellulose (MFC) product which has a low water content, high solid content, and is thus easy to pack, transport, store and handle. When transporting huge amounts of MFC product it is essential to decrease or minimize the amount of water in the product. Advantages in shelf life, storage temperature, and needed space, is providable with the present invention. The present MFC contains much of the constituents of the raw material, as processing of the raw material has not extracted and/or washed away too much of the originally ingoing raw material components. Thus, the present invention may use secondary streams from industry, such as agricultural processing industry, to provide the present MFC. As the invention uses a larger amount of the raw material, less waste needed to be disposed is provided, which provides environmental benefits. Also, the present MFC provide a more natural ingredient for paper production.

The present invention provides a granular microfibrillated cellulose (MFC) product with improved flowability for improved handling and transportability, without deteriorating its end-use properties. The decrease in or prevention of hornification upon redispersion at use e.g. in a papermaking process provides a MFC which is better suited as a paper strength agent, as it provides strength to the paper web and/or paper being produced. The present invention thus provides an easily redispersible MFC, which also have good flow properties in its dewatered and/or dried state, i.e. the present MFC is so called free-flowing. By "free-flowing" is herein meant a dry, particle-like state, with freely flowing characteristics, which provides an easy-to-handle and pour product, which is not gel-like. The dry particle-like state in the present context may be a composition preferably in the form of a pellet, granule, grain, compressed tablet, or briquette, that preferably do not stick to other surfaces it is in contact with. The present granular MFC product is a dry product, not gel-like or of a semi-liquid form, which product is easily redispersed and prevents hornification, without the need to include hornification-preventing additives.

The present granular microfibrillated cellulose product also provides a higher bulk density compared to known MFCs.

Free water content is low in the present granular microfibrillated cellulose product. The wording "free water" is herein intended to refer to water that is mobile, i.e. available for microbe cells, and is not bound to particles, or locked within aggregates or similar structures. Free water is moisture not retained or absorbed by aggregates or similar structures. Free water is moisture removable by air-drying under standard conditions and may also be called surface moisture.

The MFC product according to the present invention has preferably improved shell life. The present granular microfibrillated cellulose product may allow storage for at least one week, two weeks, one month, preferably at least two months, without any substantial microbial growth (less than 1 log of delta microbe quantity) during said time period, depending on the storage temperature and remaining water content in the granular MFC product after drying.

Microbial growth in an embodiment of the granular MFC product according to invention is preferably having less than 2 log microbial growth or even preferably having less than 1 log microbial growth as delta microbe quantity in at least one week, preferably in at least two weeks, more preferably in at least one month, even more preferably in at least two months, when stored in temperatures of 15-25° C., in sealed packaging that prevent moisture entry.

Control of excess microbiological growth may help combat slime formation which may spoil MFC granule form and lead to poor flowability of the MFC. Microbiological shelf life of MFC may thus be an important quality parameter.

Preventing excess microbiological growth may also be of importance to use of an MFC product in different applications.

Handling of a free-flowing MFC product compared to sticky or gel-like MFC product is also an important advantage for a user specially in high volume industries. Higher solid content makes it easier to transport and to transfer at a user, such as in a paper mill environment, or in any other industry environment or environment where used. This may in addition save costs and space in make-down equipment. Further, for the obtainable higher dry solids content, additives, such as drying additives or hornification-preventing additives, are not necessarily needed in a drying step, which saves energy costs, additive costs, and allows for simpler processing. Anionicity may further be achieved with or without chemical modification.

With a higher bulk density of a granular product less space i.e. volume, is needed in transportation.

The present invention relates to provision of a granular microfibrillated cellulose product originating from other sources than normally used to provide such materials. Normally wood-based sources are used for MFC production.

The present invention provides a possibility to achieve higher valorization of agro-industrial biomasses and to use the existing resources more efficiently.

SHORT DESCRIPTION OF THE DRAWINGS

FIG. 1 shows photos of 1) dewatered (and dried) microfibrillated cellulose according to conventional processes, named original product, and 2) dewatered and dried microfibrillated cellulose according to the present invention having been dried in a fluidized bed, named final product.

DETAILED DESCRIPTION

The present invention provides a granular microfibrillated cellulose product, which include microfibrillated cellulose originating from agricultural biomass. The present microfibrillated cellulose composition is useful as a strength agent in papermaking. The granular microfibrillated cellulose product may herein also be referred to as microfibrillated cellulose granules.

Hornification is a descriptive term for physical and chemical changes that occur to pulp fibers during drying, principally shrinkage and formation of internal hydrogen bonds. Some of the hornification may cause irreversible effects.

Hornification may occur during production of microfibrillated cellulose (MFC) products. If hornification would appear during manufacturing, such a material would become difficult to make down, i.e. redisperse or activate, into a dispersion, before addition to a pulp finish of a papermaking process. Hornification effected MFC is thus not desirable to obtain. MFC may be difficult to obtain in high concentrations due to the possible effect of hornification. It is believed that hornification may be a cause for concentrated MFC after rewetting not performing as good as without concentration, due to important performance factors such as strength becoming impaired.

The present inventors have surprisingly found a granular microfibrillated cellulose product which is not affected by hornification, or as prone to hornification as known compositions, and is easily handled and transported. The granular microfibrillated cellulose product according to the invention is easily activated and re-dispersed. This means that it may be easily diluted and dispersed after having been provided in a granular form, without hornification appearing. Thus, the present invention provides a granulated microfibrillated cellulose product which may be provided in high concentrations, i.e. high solids content, and may easily be rewetted before addition to pulp, and providing a paper product having sufficient strength.

The present granular microfibrillated cellulose product comprises a microfibrillated cellulose originating from agricultural biomass, said microfibrillated cellulose product comprising ≤75 wt % of cellulose, such as ≤70 wt %, based on dry solids content of said product, wherein said granular microfibrillated cellulose product has a bulk density of 500-1200 kg/m$^3$;

a flowability of 5-60 ml/s, measured by a Copley scientific powder flowability tester having a stainless steel cylinder with orifice 16 or funnel with orifice 15; and a water content of at most 60 wt %, based on total microfibrillated cellulose product.

Said product is easily redispersible in water. This also despite a high dry solids content. Thus, hornification is no significant issue for the present invention.

The granular microfibrillated cellulose product may further comprise ≥25 wt %, such as ≥30 wt %, of hemicellulose, pectin, lignin, protein, and if present ash, in total, based on total microfibrillated cellulose product.

The granular microfibrillated cellulose product may comprise:
  8-25 wt % hemicellulose, preferably 8-20 wt %, or 8-15 wt %,
  1-15 wt % pectin, preferably 1-10 wt %, or 1-8 wt %,
  0-12 wt %, lignin, preferably 0-10 wt %, or 0-8 wt %, and
  0-8 wt % protein, preferably 0-6 wt %, or 0-5 wt %,
based on dry solids content of said product.

The microfibrillated cellulose product may comprise:
  ≥30 wt % cellulose, such as 50-99 wt %, 50-69 wt % or 60-90 wt %,
  1-15 wt % pectin, such as 1-10 wt %, 1-8 wt %, or 1-5 wt %,
  8-25 wt % hemicellulose, such as 8-20 wt %, 8-15 wt %, or 10-20 wt %,
  0-12 wt %, lignin, such as 1-12 wt %, 0-10 wt %, 0-8 wt %, or 5-12 wt %,
  0-15 wt % ash, such as 1-15 wt %, 0-10 wt %, 0-8 wt %, or 1-10 wt %, and
  0-8 wt % protein, such as 1-8 wt %, 0-6 wt %, 0-5 wt %, or 1-6 wt %,
based on dry solids content of said product. The amount of cellulose is at least 30 wt %, and may be in the range of 50-99 wt %, 60-90 wt %, 30-99 wt %, 40-69 wt %, 45-69 wt %, 45-65 wt %, 50-65 wt %, 50-60 wt %, 50-69 wt %, 55-69 wt %, 60-69 wt %, or 55-65 wt %, based on dry solids content of said product. The amount of hemicellulose is 8-25 wt %, and may be in the range of 8-20 wt % such as 8-18 wt %, 8-15 wt %, 10-18 wt %, 10-20 wt %, 10-15 wt %, 12-18 wt %, or 14-16 wt %, based on dry solids content of said product. The amount of pectin is 1-15 wt %, and may be in the range of 1-10 wt %, 1-8 wt %, 1-7 wt % 1-5 wt %, 5-10 wt %, 1-3 wt %, or 1-2 wt %, based on dry solids content of said product. The amount of lignin is 0-12 wt %, and may be in the range of 1-12 wt %, 0-10 wt %, 5-12 wt %, 1-10 wt %, 5-10 wt %, 0-8 wt %, 5-8 wt %, or 0-5 wt %, based on dry solids content of said product. The amount of ash is 0-15 wt %, and may be in the range of 1-15 wt %, 0-10 wt %, 1-10 wt %, 5-10 wt %, 0-8 wt %, 5-8 wt %, or 0-5 wt %, based on dry solids content of said product. The amount of protein is 0-8 wt %, and may be in the range of 1-8 wt %, 0-6 wt %, 1-6 wt %, 0-5 wt %, 2-5 wt %, 0-4 wt %, 2-4 wt %, or 0-3 wt %, based on dry solids content of said product.

The microfibrillated cellulose product may comprise 50-69 wt % cellulose 1-10 wt % pectin, 8-15 wt % hemicellulose, 0-5 wt %, lignin, 0-5 wt % ash, and 0-4 wt % protein, based on dry solids content of said product.

The microfibrillated cellulose product may comprise 55-65 wt % cellulose 1-7 wt % pectin, 8-15 wt % hemicellulose, 0-5 wt %, lignin, 0-5 wt % ash, and 0-3 wt % protein, based on dry solids content of said product.

The granular MFC product may have a water content of at most 60 wt %, such as at most 55 wt %, at most 50 wt %, at most 45 wt %, at most 40 wt %, at most 38 wt %, at most 35 wt %, at most 30 wt %, at most 25 wt %, at most 20 wt %, at most 15 wt %, or at most 10 wt %, based on total amount of the microfibrillated cellulose product.

The handling of an MFC product having a low water content is easier due to less stickiness, and high content MFCs are free-flowing materials and can be made down by simple make-down units.

The granular MFC product may have a bulk density of 550-1000 kg/m$^3$, such as 600-900 kg/m$^3$, 650-850 kg/m$^3$, or 650-800 kg/m$^3$. Bulk density being defined as mass per unit volume of a material after it has been poured freely into a container, ISO 7837:1992.

The granular microfibrillated cellulose product may have an average diameter (D50) of 50-10000 μm, such as 100-8000 μm, 200-6000 μm, 400-5000 μm, 600-4000 μm, 800-3000 μm, 1000-2000 μm, 1100-1900 μm, or 1200-1800 μm.

The granular MFC product may be about spherical, elliptical, or cylindrical in shape, such as about spherical, or elliptical in shape. If the microfibrillated cellulose product is of an elongated or slightly elongated shape such as elliptical, or cylindrical shape, the average length is preferably at most three times as long as the average diameter, preferably at most twice as long as the average diameter, preferably at most 50% longer than the average diameter, and preferably about the the same length as the diameter.

The granular MFC product may have a flowability of 10-50 ml/s, such as 12-45 ml/s, 15-45 ml/s, 15-40 ml/s, 20-40 ml/s, 10-30 ml/s, 10-25 ml/s, 12-35 ml/s, 12-25 ml/s, 15-30 ml/s, or 35-40 ml/s, measured by a Copley scientific powder flowability tester having a stainless steel cylinder with orifice 16 or funnel with orifice 15.

Both flowability and bulk density are important features for the granular microfibrillated cellulose product to achieve the desirable easily manageable and transportable material.

The present microfibrillated cellulose product may not contain any added hornification preventing additives, such as long hydrocarbons, e.g. fatty alcohols, and/or fatty acids, wherein the fatty alcohols may be polyols. Examples of such long hydrocarbons are e.g. tall oil, linseed oil, castor oil, olive oil, palm oil, peanut oil, soybean oil, sesame oil, glycerol, and any combination thereof. Hornification preventing additives go between the fibers of the microfibrillated cellulose and pulp furnish, and stick thereto, and physically prevent formation of hydrogen bonds which cause hornification. The present microfibrillated cellulose product may not contain any hornification preventing additives at all.

Excessive water content of MFC granules could support growth of e.g. typical soil microbes. Thereby a treatment to control the growth of e.g. such microbes is needed. If the microbe activity is not controlled, excessive growth may lead to the decrease of the quality of the MFC raw material, and granular end product. In an MFC product having a composition of 75 wt % or less, or 70 wt % or less, cellulose content, the remaining sugars may act as a nutrient source for microbes. In anaerobic conditions typically unwanted metabolites, e.g. volatile fatty acids are produced by the microbes. Another unwanted reaction in anaerobic conditions is $H_2S$ gas formation, which may lead to explosions of the MFC storage tanks, or even more severely cause death of the workers in case $H_2S$ gas replace oxygen in the breathing air. The microbes may have an effect on e.g. physical characteristics of the MFC granules, e.g. the product may suffer slime problems. Thereby, the flow properties of the granules may decrease. Granules may even stick together. Also other problems of microbial growth may be faced.

It is preferable to provide a granular MFC product which is as natural as possible. Depending on the end use of the MFC, food preservatives could be used, instead of industrial biocides. If industrial biocides are used, food contact regulations are typically a limiting factor, if MFC is to be used in such food applications. Thus, it is preferable that at most a very low amount of biocides are added, such that biocide dosage levels do not risk nor limit any of the end use applications of the MFC product. Typical restrictive parameters for MFC biocide dosage level are food contact regulations that are set for the MFC containing end products, such as food packaging carton board. Biocide treatment of MFC may not bring unwanted biocide residuals to the subsequent manufacturing processes. As an example, an amount of halogen containing compounds needs to be limited as halogen biocide residuals from MFC could disrupt further processes using MFC, such as paper making processes. Even more preferable is if the granular MFC product contain no added biocides. If regulations on the residuals are not a limiting factor, some amounts of biocides may be used. It may be possible to use only fungicides or in some embodiments both fungicides and bactericides. In some embodiments only bactericides may be used. Fungicides and bactericides are included within the scope of biocides. With the present invention it may be possible to provide a MFC product with improved shelf life without a need of biocides, or without need of fungicides, or without need of bactericides, or without need of fungicides and bactericides.

It has been found that by drying the MFC to water content of <60%, low or no amount of biocides, such as bactericides, and/or fungicides, may be needed in the MFC to provide a good storage stability.

The present microfibrillated cellulose product preferably do not contain additives added in the process to provide said microfibrillated cellulose product. Any biocides which may have been added to the growing agricultural crop, or any additives added in a prior process to provide said agricultural biomass, if it is e.g. a byproduct or secondary stream of another process, such additives are not to be interpreted or included as added additives in the present microfibrillated cellulose product, or its manufacture.

The microfibrillated cellulose product may comprise or consist only said microfibrillated cellulose as dry solids, and water.

The shelf life of the microfibrillated cellulose product may be at least one week, such as at least two weeks, at least one month, or at least two months, when stored in a temperature of about 15-25° C., in sealed packaging that prevent moisture entry. For an acceptable shelf life the possible microbial growth is less than 2 log, more preferably less than 1 log (delta microbe quantity) during said time period. In some cases the acceptable microbial growth is less than 3 log. The MFC shelf life is strongly influenced by growth rates of microbes. As an example, microbiological growth may create unwanted metabolites, such as volatile organic compounds (VOC) that may cause organoleptic problems to MFC and thus risk further end use of MFC. Unwanted metabolites may also include microbial toxins that may risk process and product safety, and even endanger personnel safety. One critical microbial group is endospore forming bacteria, which may endanger hygiene properties of the MFC, and especially MFC end use. As an example, bacterial endospore content may be a critical parameter in the production of hygienic carton board (board) for food packaging. Additionally, excess microbiological growth may lead to slime formation which may spoil MFC granule form and lead to poor flowability of the MFC. Microbiological shelf life of MFC may thus be an important quality parameter. Microbiological shelf life may be expressed e.g. as an acceptable growth rate, i.e. microbe quantity just after the drying step of the MFC, compared to the microbe quantity at a specified storage time. The microbe quantity just after the drying may often be at the same level as just before the drying step. Delta microbe quantity of less than 1 log, indicates no significant microbiological growth in the MFC. Delta microbe quantity of less than 2 log may also be acceptable. In some cases even delta microbe quantity of less than 3 log may be acceptable. Growth rate values may be calculated by using either conventional plate counting (cfu/ml), or some other microbiological monitoring methods, such as molecular biology based methods, like qPCR (genes/ml) or colorimetric based methods, such as ATP (pg/ml). For the growth values one or more of total aerobic bacteria, aerobic bacterial endospores, anaerobic bacteria, anaerobic bacterial endospores, as well as molds and yeasts may be used.

In order to be able to produce acceptable microbial shelf life, MFC after the production and before the drying step should be non-spoiled material. For a non-spoiled material microbe levels <104 are normally considered non-spoiled. The use of the granular MFC product may set even stricter requirements for the microbe content before or just after drying.

The granular microfibrillated cellulose product is stated as orginating from agricultural biomass. The agricultural biomass is preferably originating from agricultural crops, which may have been processed such as agricultural wastes, by-products, or secondary streams of processing steps. It is to be noted that herein the cellulose containing material may be secondary streams or residues from earlier processing steps of agricultural crops.

The agricultural biomass may be in the form of pomaces, clippings, fragmented, crushed or beaten matter.

The agricultural biomass may originate from crop selected from the group consisting of vegetables, fruits, grass, buckwheat; members of the Fabaceae family, and any combination thereof;
preferably selected from the group consisting of sugar beet; potato; cassava; sweet potato; parsnip; radish, carrot; ginger; ginseng; onion; tomato; cranberry blueberry apple: pear; citrus fruits, preferably selected from orange, lime, lemon, and grapefruit; cereals, preferably selected from maize, whete, oats, rye, barley, sugar cane, and sorghum; buckwheat; peas; beans, preferably dry beans and/or soy beans, and any combination thereof; preferably selected from the group consisting of sugar beet, potato, sugar cane, carrot, cassava, sweet potato, cereals, such as maize, and any combination thereof.

The agricultural biomass may comprise at least 10 wt % of cellulose, based on dry solids content of said biomass, preferably at least 20 wt % of cellulose.

Microfibrillar cellulose (MFC) may also be called nanofibrillar cellulose (NFC), nanocellulose, nanofibrillated cellulose, cellulose nanofiber, nano-scale fibrillated cellulose, microfibrillated cellulose, or cellulose nanofibrils (CNF). The wordings may be used interchangeably herein. The size of the MFC fibers may vary depending on the specific manufacturing process.

The microfibrillated cellulose material of the present product is obtained as cellulose microfibrils or cellulose microfibril bundles. The length of the microfibrils in the microfibrillated material is typically >1 µm, preferably 1-200 µm, even more preferably 10-100 µm, most preferably 10-60 µm. The diameter of individual microfibrils may be in the range of 2-200 nm, preferably 2-100 nm, more preferably 4-70 nm, even more preferably 5-40 nm. Microfibrillated cellulose material may often comprise bundles of 10-50 microfibrils, the diameter of microfibril bundles being normally <1 µm.

An agricultiral biomass is used as a raw laterial, it may contain some microbes originating especially from soil.

The present granular microfibrillated cellulose product may be obtained by a method of manufacturing, comprising the steps of:

providing a microfibrillated cellulose composition originating from agricultural biomass;

optionally dewatering the microfibrillated cellulose composition to obtain a dewatered microfibrillated cellulose composition;

drying the microfibrillated cellulose composition, which optionally has been dewatered, to provide a granular microfibrillated cellulose product.

The shape of the MFC product may be provided before, during, or after the drying step. The MFC material may be shaped such as brought into a granular form. The shaping may be a pre-structuring or a post-structuring of the MCF to provide a desirable shape, such as pellet, granule, grain, tablet, or briquette. The shaping may be conducted by compacting or compressing the MFC material. In one embodiment the MFC is pre-shaped before the drying step, and after drying providing the granular MFC product. In another embodiment dried MFC may be shaped after drying to the granular MFC product form. In one embodiment the granular MFC product is provided after the drying, without any pre-shaping or post-shaping step.

The drying may be performed using air or other gas, which may be heated, to perform the drying step. The drying may be done at good circulation of air or other gas. The air or other gas circulation may provide an air-suspension, other gas-suspension, or mixing motion of the drying material to provide a dried MFC product. Thus, the drying step may provide sort of a simultaneous heating and mixing or suspension of the composition to provide the dried MFC product.

MFC entering the drying step is preferably of a dry solids content of 10-35 wt %.

From microbial control point of view, the drying step is preferably done within 14 days, such as within 10, 7, 5, 4, 3, 2, or 1 day of provision of the MFC, including optional dewatering. The drying step is preferably performed within 24 h, preferably within 12 h, preferably within 6 h, preferably within 4 h, preferably within 2 h, preferably within 1 hour, of the MFC provision, including optional dewatering, and even more preferably without any delay or immediately transported to drying step. The drying step is preferably done as early as possible after MFC composition production to reduce spoilage due to microbial growth. The produced MFC composition may be packaged into vacuum packaging to increase the durability before a drying step, which may need to be performed at a later stage. If the MFC composition is vacuum packaged before drying it preferably has a solids content of about 10-35 wt %.

The drying step may be using an equipment comprising a fluidized bed (dryer), paddle dryer, dispersion dryer, disc dryer, drum dryer, flash dryer and tubular dryer. In an embodiment a band filter may be used whereby it may be a way to combine mechanical dewatering and drying.

The method may further comprise a disintegration step before the drying of the microfibrillated cellulose composition to disintegrate the obtained microfibrillated cellulose composition into smaller pieces. This is especially needed if the microfibrillated cellulose composition has been vacuum packed before drying. The disintegration step may be performed after the optional dewatering step. Disintegration is in this step intended to mean causing the material to form into smaller pieces. The material may be e.g. shredded or teared up to disintegrate the material. Disintegration in this step is preferably performed mechanically. In disintegration the material is produced into smaller pieces and a more finely divided material is provided. Disintegration may be performed by any suitable step or device, e.g. an extruder, an impeller, and/or a perforated plate.

A disintegration step may also be provided before the optional dewatering step. A disintegration step may also be included both before and after the optional dewatering step. After the MFC production the process steps with regards to disintegration may be as follows: disintegration, mechanical dewatering, disintegration, (thermal) drying; disintegration, (mechanical) dewatering, (thermal) drying; mechanical dewatering, disintegration, (thermal) drying; disintegration, (thermal) drying; or any other combinations of the different steps.

The free-flowing particle-like state may have included processing the MFC using a combination of compressing, extruding, cutting, blowing, and milling, to provide the present granular MFC product. The free-flowing particle-like granular MFC may have been obtained using the processes disclosed above including drying and optional disintegration, and/or shaping of the MFC material.

The drying step may be performed at a temperature of 45-99° C., such as 50-95° C., 55-90° C., 60-85° C., 70-85° C., or 75-85° C.

The drying step may be performed for a time period of at most 40 min, such as at most 30 minutes, at most 25 minutes, or 5-25 minutes.

For example, during drying in the drying step the water present in the MFC composition may during the first 5 minutes of the process evaporate a relatively low amount of water from the product, thereafter during roughly the next 15 minutes the main part of the water content evaporated in total may be leaving the MFC composition, then from about 20 minutes from the initiation of the drying once again very little of the water of the MFC composition is evaporated, which is due to the water that is left in the composition at this stage is tightly bonded within the structure.

The present granulated microfibrillated cellulose composition may be used e.g. in the manufacturing of a paper or paperboard product. Herein is also included a paper or paperboard product comprising said microfibrillated cellulose product. The present paper or board product may be selected from fine papers, pringing paper, towels, tissues, and packaging materials, such as a food packaging materials.

Paper manufacturing may be divided into several sections. Pulp is provided. The pulp may be refined and/or may be mixed in water, e.g. with other additives, to make a pulp furnish. The pulp furnish may be provided as a wet web, water is drained from the web, the wet paper sheet may go through presses and dries, and finally rolled into large rolls.

"Pulp" refers typically to a fibrous cellulosic material. The pulp may also refer to cellulosic fibers, non-cellulosic polymeric fibers, or any combinations thereof. Suitable cellulosic fibers for the production of the pulps are all conventional grades, for example mechanical pulp, bleached and unbleached chemical pulp, recycled pulp, and paper stocks obtained from all annuals. Mechanical pulp includes, for example, groundwood, thermomechanical pulp (TMP), chemo thermochemical pulp (CTMP), alkaline peroxide mechanical pulp (APMP), groundwood pulp produced by pressurized grinding, semi-chemical pulp, high-yield chemical pulp and refiner mechanical pulp (RMP). Examples of suitable chemical pulps are sulfate, sulfite, and soda pulps. The unbleached chemical pulps, which are also referred to as unbleached kraft pulp, can be particularly used. In addition to cellulosic fibers, or instead of them, the pulp may comprise non-cellulosic polymeric fibers, such as fibers of polyethylene, polypropylene, or polyester, in the form of e.g. single component or bicomponent fibers.

"Pulp furnish" refers to a mixture of pulp and water. The pulp furnish may also be referred to as pulp slurry herein. The pulp furnish is prepared in practice using water, which can be partially or completely recycled from the paper machine. It can be either treated or untreated white water or a mixture of such water qualities. The pulp furnish may contain interfering substances, such as fillers. The filler content of paper may be up to about 40% by weight. Suitable fillers are, for example, clay, kaolin, natural and precipitated chalk, titanium dioxide, talc, calcium sulfate, barium sulfate, alumina, satin white or mixtures of the stated fillers. The aqueous pulp furnish may comprise recycled and/or virgin fibers.

Herein is provided a method of making a paper product comprising:

providing an aqueous pulp furnish, draining the aqueous pulp furnish to form a wet fiber web, and drying the wet fiber web to obtain the paper or paperboard product; and providing and resdipersing the present granular microfibrillated cellulose product in water, to provide a dispersed microfibrillated cellulose adding the dispersed microfibrillated cellulose to the aqueous pulp furnish or on the wet web.

Alternatively, a method of making a paper product may comprise the steps:

providing an aqueous pulp furnish, draining the aqueous pulp furnish to form a wet fiber web, and drying the wet fiber web to obtain the paper or paperboard product; and providing the present granular microfibrillated cellulose product and adding the granular microfibrillated cellulose to the aqueous pulp furnish.

The granular microfibrillated cellulose product, or microfibrillated cellulose dispersion may be added to the pulp suspension, preferably to the thin or thick stock.

Optionally, the granular MFC product could be added to the dry fiber furnish and thereby be wetted and redispersed together with the paper or paperboard making furnish.

The microfibrillated cellulose dispersion may be added to the aqueous pulp furnish or on the wet web in an amount of about 1-100 kg microfibrillated cellulose composition/ton pulp furnish, preferably about 1-70 kg/ton, preferably about 5-70 kg/ton, preferably 10-50 kg/ton, preferably 15-50 kg/ton, based on dry solids content of microfibrillated cellulose composition per ton of dry solids of pulp furnish. The same amounts may be used for a granular microfibrillated cellulose product added to the dry or aqueous pulp furnish.

The present granulated microfibrillated cellulose product may be used as a strength additive in the manufacture of paper or paperboard products. Tissue is herein included into paper product. The paper or paperboard products produced may comprise e.g. fine papers, printing paper, towels, tissues, and packaging materials.

EXAMPLES

Analytical Methods:
1.1 Flowability Measurement

The flowability was measured by a gravimetric method in which a 200 or 180 mL MFC sample flowed freely through a cylinder or funnel and the flowing velocity was monitored. The velocity was monitored via weighting the material which was flowed through the cylinder/funnel as a function of time. Copley scientific powder flowability tester was used in flowability measurements (stainless steel cylinder with orifice 16 and funnel with orifice 15, respectively).

1.2 Bulk Density Measurement

Bulk density was measured via filling a 100 mL container accurately with a granular MFC product and weighting the content. The measurement was repeated three times and the average of the results was calculated.

1.3 Size Characterisation Analysis

Particle size distribution: The particle size distribution was determined by sieve analysis (for product). Engelsmann JEL 200 device was used for 5 minutes. This is also used for particle size measurements of the granular MFC product, such as determination of the average particle size (D50).

1.4 Viscosity

Viscosity value (mPa, cp) is referring to viscoelastic property of a substance and/or substances in the chosen solvent. It is dependent on different parameters such as structure, chemical composition, molecular weight of substances and the measuring temperature.

For viscosity measurement a 1 wt % sample was prepared according to the standard laboratory protocol. The pH of the 1 wt % sample was adjusted to 8-9 with either NaOH or HCl. Viscosity was measured with 50 rpm and 100 rpm at 25° C. using a spindle with vane geometry (Brookfield V-72, V-73 or V-75). The Brookfield viscosity was measured using a Brookfield DV-Il viscosimeter according to the equipment specific instruction manual.

TABLE 1

| Analytical method | Analyzed substance/ property | Used protocol/standard |
|---|---|---|
| Brookfield viscometer | Viscosity, rehological properties, size, fibrillation stage | Internal protocol, based on the manual of the equipment |
| Flowability | Flowing properties | Copley scientific powder flowability tester Cylinder with orifice 16 Funnel with orifice 15 |
| Bulk density (i.e. loose bulk density) | | E.g. ISO 7837:1992 Mass per unit volume of a material after it has been poured freely into a container |
| Size characterisation | Particle size | Engelsmann JEL 200 |

Example 1: Flowing Properties and Bulk Densities of Dried MFC Samples

Three MFC samples with different solids content were prepared with fluid bed drying. The chemical composition of dried MFC by weight % was as follows: 66 wt % cellulose, 10 wt % hemicellulose, 7 wt % lignin and 2 wt % pectin. A pre-treatment step was performed prior drying. The purpose of the pre-treatment step was to disintegrate the 22 wt % MFC material into small, wet granulates, which were easily dried with fluid bed. A picture of pre-treated material and treated material is shown in FIG. 1.

The flowability and bulk density values of different solid content sugar beet MFC samples are summarized in Table 2. The flowability was measured by a gravimetric method in which a 200 mL MFC sample flowed freely through a cylinder or funnel and the flowing velocity was monitored. The velocity was monitored via weighting the material which was flowed through the cylinder/funnel as a function of time. Copley scientific powder flowability tester was used in flowability measurements (stainless steel cylinder with orifice 16 and funnel with orifice 15, respectively).

Bulk density was measured via filling a 100 mL container accurately with a granular MFC product and weighting the content. The measurement was repeated three times and the average of the results was calculated.

TABLE 2

| Solid content | Bulk density (kg/L) | Flowability, funnel 15 | Flowability, cylinder 16 |
|---|---|---|---|
| 22 wt % | 0.57 | not flowing material | not flowing material |
| 22 wt %, pre-treted material | 0.45 | not flowing material | not flowing material |
| 55 wt % | 0.50 | 13 sec/200 mL | 15 sec/180 mL |
| 76 wt % | 0.55 | 13 sec/200 mL | 14 sec/180 mL |
| 90 wt % | 0.63 | 9 sec/200 mL | 11 sec/180 mL |
| 99 wt % | 0.74 | nd | nd |

It can be stated based on the flowing measurement results shown in Table 2 that the 90 wt % MFC sample has better flowing properties than the samples with lower solid content. This is most probably due to the higher bulk density of the 90 wt % sample compared to the 55 wt % and 76 wt % samples.

Example 2: Re-Dispersion of the Granular MFC Products

A standard lab activation of granular MFC samples was done via two step protocol: 1) a wetting step (magnetic stirring, 2 wt % solution, time: 2 hours-overnight, temperature: +23° C.), wherein granular MFC samples were contacted with water, after which 2) the solution was homogenized with Ultraturrax high-shear mixer (3×10 sec, 1000 rpm).

Re-dispersion of the granular samples with different solid contents was studied. The results are summarized in table 3.

TABLE 3

Viscocity measurements of the dried MFC samples after 3 h, 6 h and 24 h wetting step to redisperse the MFC.

| Solid content of granules (wt %) | Viscocity (cp) 50 rpm spindel 75 | | |
| | 3 h wetting 2 wt % | 6 h wetting 2 wt % | 24 h wetting 2 wt % |
|---|---|---|---|
| 55 | 196 | 323 | 799 |
| 76 | 571 | 811 | 1665 |
| 90 | 431 | 623 | 1322 |

It can be clearly seen from table 3 that all of the dried granular MFC products are re-dispersable into water.

Example 3: Effect of Drying on Microbal Growth

Objective of this laboratory test was to study preservation effect of drying against microbiological growth in the microfibrillated cellulose (MFC) sample. MFC sample (2 kg) was stored in vacuum at cold +4° C. for 2 weeks, without biocide treatments. At start of the test the MFC sample was divided to 6 individual samples (á 300 g). To obtain equal mold spore content in the MFC samples at start, each sample was spiked with additional mold spores of *Aspergillus niger* and *Penicillium verrucosum* targeting for mold spore level of about 200 cfu/ml. The spore solution for spiking was prepared as follows: freezed pure cultures of the molds were pre-grown for 5 days at +25° C. on commercial Potato Dextrose Agar, after which the mold cells were harvested to commercial Ringer solution (10 ml), mixed together and diluted (1:10) with Ringer solution to gain a mold spiking-liquid. Spiking of this liquid was made as follows: in total 6 ml of the mold liquid was added to 2 kg of MFC, addition was made in small quantities (60×100 μl), to obtain a homogenous mixture. After the spiking, one reference sample was stored without drying, and samples 2-6 were dried (+55° C., fluidized bed dryer, Sherwood Model 501) for 10 min to 30 min to obtain MFC samples with different water content. After the drying, samples (á 75 g) were stored in plastic bags at room temperature. Preservation efficacy of the drying was followed by Molds (Saborous agar, +25° C., 4 days incubation), Anaerobic bacteria (Brewer agar, +25° C., 3 days incubation) and Aerobic bacterial endospore cultivations (Plate Count agar, +32° C., 2 days), at start, and after 3 days, 1 week and 2 weeks storage times. Preservation efficacy of the drying was followed by Molds for lower water content samples #5 and #6. Prior to the bacterial endospore determination, samples were pasteurized at +80° C. for 20 min. Water content percentage was calculated by weighing first the suspended solids per kg of MFC (water content %=100%−(dry weight of sample per total weight of sample)×100%). Results are shown in Table 1A (Molds), 1B (Anaerobic bacteria) and 1C (Aerobic bacterial endospores).

TABLE 4

| A Sample | Water content (%) | Molds (cfu/ml) | | | | |
|---|---|---|---|---|---|---|
| | | At start (before drying) | At start (after drying) | 3 days | 1 week | 2 weeks |
| #1 Reference without drying | 78.4 | 200 | — | >100 000 | >100 000 | >100 000 |
| #5 MFC dried | 29.1 | 380 | 340 | 100 | <10 | 50 |
| #6 MFC dried | 17.3 | 740 | 320 | 140 | <10 | 400 |

| B Sample | Water content (%) | Anaerobic bacteria (cfu/ml) | | | | |
|---|---|---|---|---|---|---|
| | | At start (before drying) | At start (after drying) | 3 days | 1 week | 2 weeks |
| #1 Reference without drying | 78.4 | <10 | — | <10 | <10 | 29 000 |
| #2 MFC dried | 59.4 | <10 | <10 | <10 | <10 | <10 |
| #3 MFC dried | 47.5 | <10 | <10 | <10 | <10 | <10 |
| #4 MFC dried | 40.5 | <10 | <10 | <10 | <10 | <10 |
| #5 MFC dried | 29.1 | <10 | <10 | <10 | <10 | <10 |
| #6 MFC dried | 17.3 | <10 | <10 | <10 | <10 | <10 |

| C Sample | Water content (%) | Aerobic bacterial endospores (cfu/ml) | | | | |
|---|---|---|---|---|---|---|
| | | At start (before drying) | At start (after drying) | 3 days | 1 week | 2 weeks |
| #1 Reference without drying | 78.4 | 40 | — | <10 | 90 | 46 000 |
| #2 MFC dried | 59.4 | 30 | <10 | <10 | 50 | <10 |
| #3 MFC dried | 47.5 | 20 | <10 | <10 | 10 | <10 |
| #4 MFC dried | 40.5 | 50 | 30 | <10 | 10 | <10 |
| #5 MFC dried | 29.1 | 30 | <10 | <10 | <10 | <10 |
| #6 MFC dried | 17.3 | 30 | 10 | <10 | 30 | <10 |

Results in Table 1A-1C show that microbiological growth was at high level in the non-preserved reference MFC sample in 2 weeks storage: heavy mold growth was seen in the spiked MFC sample already in 3 days, and authentic anaerobic bacterial population as well as aerobic bacterial endospores levels significantly increased in 2 weeks storage. Results thus clearly show the need of MFC microbe control in case MFC is stored for several days. Surprisingly, drying of MFC to a water content of <60% showed an excellent preservation effect against the natural bacterial population flora (1B and 1C). Drying of MFC to a water content of <30%, showed an excellent preservation effect against both the spiked molds (1A).

The tests indicate that by drying the MFC to water content of <60%, no bactericides are necessarily needed. The tests performed indicate that when the MFC is dried to water content of less than 30%, at least at that water content no fungicides were necessarily needed. At least when water content after drying was less than 30% no biocides (fungicides or bactericides) at all may be needed at all for microbe control. The case may be the same also for even higher water contents remaining in the MFC product after the drying.

The invention claimed is:
1. A dried, water dispersible granular microfibrillated cellulose product comprising a microfibrillated cellulose originating from agricultural biomass, said microfibrillated cellulose product comprising ≤70 wt % of cellulose 8-25 wt % hemicellulose or 8-20 wt % hemicellulose, or 8-15 wt % hemicellulose, 1-15 wt % pectin, or 1-10 wt % pectin, or 1-8 wt % pectin, 0-12 wt %, lignin, or 0-10 wt % lignin, or 0-8 wt % lignin, and 0-8 wt % protein, or 0-6 wt % protein, or 0-5 wt % protein based on dry solids content of said product, wherein said granular microfibrillated cellulose product has
    a bulk density of 500-1200 kg/m$^3$;
    an average diameter D50 of 200-6000 μm;
    a flowability of 10-30 ml/s or 10-25 ml/s, measured by a Copley scientific powder flowability tester having a stainless steel cylinder with orifice 16; and
    a water content of at most 30 wt %, based on the total microfibrillated cellulose product, and wherein said dried granular microfibrillated cellulose product is resistant to bacterial and fungal contamination after being stored for at least 2 weeks at temperatures of 15-25° C. without the addition of any bactericides or fungicides.

2. The dried, water dispersible granular microfibrillated cellulose product according to claim 1, wherein microfibrillated cellulose product comprises ≥25 wt % of hemicellulose, pectin, lignin, protein, and optionally ash in total, based on dry solids content of said product.

3. The dried, water dispersible granular microfibrillated cellulose product according to claim 1, wherein microfibrillated cellulose product has a water content of at most 25 wt %, or at most 20 wt %, or at most 15 wt %, or at most 10 wt %, based on total microfibrillated cellulose product, and wherein said dried granular microfibrillated cellulose product is resistant to bacterial and fungal contamination after being stored for at least 2 weeks at temperatures of 15-25° C. without the addition of any bactericides or fungicides.

4. The dried, water dispersible granular microfibrillated cellulose product according to claim 1, wherein microfibrillated cellulose product has a bulk density of 550-1000 kg/m$^3$, or 600-900 kg/m$^3$, or 650-850 kg/m$^3$, or 650-800 kg/m$^3$.

5. The dried, water dispersible granular microfibrillated cellulose product according to claim 1, wherein microfibrillated cellulose product has an average diameter (D50) of 800-3000 μm or 1000-2000 μm, or 1100-1900 μm, or 1200-1800 μm.

6. The dried, water dispersible microfibrillated cellulose product according to claim 1, wherein the microfibrillated cellulose product does not contain added hornification preventing additives.

7. The dried, water dispersible microfibrillated cellulose product according to claim 1, wherein the granular microfibrillated cellulose product has less than 2 log, or less than 1 log microbial growth as delta microbe quantity in two weeks, or in one month, or at least two months, when stored at temperatures of 15-25° C., in sealed packaging that prevent moisture entry without the addition of any bactericides or fungicides.

8. The dried, water dispersible granular microfibrillated cellulose product according to claim 1, wherein microfibrillated cellulose product has a flowability of 10-25 ml/s or from 12.8-16.3 ml/s, measured by a Copley scientific powder flowability tester having a stainless steel cylinder with orifice 16.

9. The granular microfibrillated cellulose product according to claim 1, wherein the agricultural biomass originates from a crop (i) selected from the group consisting of vegetables, fruits, grass, buckwheat; members of the Fabaceae family, and any combination thereof; or (ii) selected from the group consisting of sugar beet; potato; cassava; sweet potato; parsnip; radish, carrot; ginger; ginseng; onion; tomato; cranberry; blueberry; apple; pear; citrus fruits, or (iii) selected from orange, lime, lemon, and grapefruit; cereals, preferably selected from maize, wheat, oats, rye, barley, sugar cane, and sorghum; buckwheat; peas; beans, preferably dry beans and/or soy beans, and any combination thereof;
or (iv) selected from the group consisting of sugar beet, potato, sugar cane, carrot, cassava, sweet potato, cereals, and any combination thereof.

10. A dried, water dispersible granular microfibrillated cellulose product according to claim 1, which comprises a solid content ranging from 90 to 99 wt %.

11. A method of manufacturing a dried, water dispersible granular microfibrillated cellulose product according to claim 1, comprising the steps of:
    providing a microfibrillated cellulose composition originating from agricultural biomass;
    optionally dewatering the microfibrillated cellulose composition to obtain a dewatered microfibrillated cellulose composition;
    drying the microfibrillated cellulose composition, which optionally has been dewatered, to provide the granular microfibrillated cellulose product.

12. The method according to claim 11, wherein the drying is performed is using an equipment comprising at least one of fluidized bed dryer, paddle dryer, dispersion dryer, disc dryer, drum dryer, flash dryer, tubular dryer, and band filter.

13. The method according to claim 11, further comprising a disintegration step before the drying of the microfibrillated cellulose composition, and preferably after said optional dewatering step, to disintegrate the obtained microfibrillated cellulose composition into smaller pieces.

14. The method according to claim 13, further comprising a packing step, before the disintegration step and drying step of the microfibrillated cellulose composition and preferably after said optional dewatering step, to package the obtained microfibrillated cellulose composition to allow storage and/or transport of the microfibrillated cellulose composition.

15. The method according to claim 11, wherein the drying is performed at a temperature ranging from 50-95° C., or ranging from 55-90° C., or ranging from 60-85° C., or ranging from 70-85° C., or ranging from 75-85° C.

16. The method according to claim 11, wherein the drying is performed for a time period of at most 40 min, or at most 30 minutes, or at most 25 minutes, or 5-25 minutes.

17. A method of making a paper or paperboard product comprising:
    providing an aqueous pulp furnish, draining the aqueous pulp furnish to form a wet fiber web, and drying the wet fiber web to obtain the paper product; and
    providing and redispersing the granular microfibrillated cellulose product according to claim 1 in water, to provide a dispersed microfibrillated cellulose, and
    adding the dispersed microfibrillated cellulose to the aqueous pulp furnish or on the wet web.

18. The method according to claim 17, wherein the dispersed microfibrillated cellulose is added to the pulp suspension, preferably to the thin or thick stock.

19. The method according to claim 17, wherein the dispersed microfibrillated cellulose is added to the aqueous pulp furnish or on the wet web in an amount of about 1-100 kg microfibrillated cellulose product/ton pulp furnish, preferably about 1-70 kg/ton, preferably about 5-70 kg/ton, preferably 10-50 kg/ton, preferably 15-50 kg/ton, based on dry solids content of microfibrillated cellulose product per ton of dry solids of pulp furnish.

20. Method of using of a dried, water dispersible granular microfibrillated cellulose product according to claim 1, as a strength additive in manufacture of paper or paperboard products, preferably in the manufacture of fine papers, tissues, or packaging materials.

\* \* \* \* \*